US008499049B2

(12) United States Patent
Lee et al.

(10) Patent No.: US 8,499,049 B2

(45) Date of Patent: Jul. 30, 2013

(54) SYSTEM AND METHOD FOR ACCUMULATING SOCIAL RELATION INFORMATION FOR SOCIAL NETWORK SERVICES

(75) Inventors: Hoon Ki Lee, Daejeon (KR); Jong-Hoon Lee, Daejeon (KR); Jung Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 386 days.

(21) Appl. No.: 13/009,494

(22) Filed: Jan. 19, 2011

(65) Prior Publication Data

US 2011/0179125 A1 Jul. 21, 2011

(30) Foreign Application Priority Data

Jan. 19, 2010 (KR) ........................ 10-2010-0004781
Oct. 14, 2010 (KR) ........................ 10-2010-0100085

(51) Int. Cl.
*G06F 15/16* (2006.01)
*G06F 15/173* (2006.01)

(52) U.S. Cl.
USPC ............ 709/206; 709/204; 709/224; 709/238

(58) Field of Classification Search
USPC .................................................. 709/204, 206
See application file for complete search history.

(56) References Cited

U.S. PATENT DOCUMENTS

| | | | | |
|---|---|---|---|---|
| 7,366,759 | B2 | 4/2008 | Trevithick et al. | |
| 7,996,456 | B2 * | 8/2011 | Gross | 709/200 |
| 2008/0209343 | A1 * | 8/2008 | Macadaan et al. | 715/747 |
| 2009/0164450 | A1 * | 6/2009 | Martinez et al. | 707/5 |
| 2010/0005105 | A1 | 1/2010 | Zhang et al. | |
| 2011/0029985 | A1 * | 2/2011 | Balandin et al. | 718/107 |
| 2011/0078231 | A1 * | 3/2011 | Oliver et al. | 709/203 |
| 2011/0161427 | A1 * | 6/2011 | Fortin et al. | 709/206 |
| 2011/0314052 | A1 * | 12/2011 | Francis et al. | 707/769 |

FOREIGN PATENT DOCUMENTS

| | | |
|---|---|---|
| KR | 1020090013274 | 2/2009 |
| KR | 1020090118478 | 11/2009 |

* cited by examiner

*Primary Examiner* — Wing F Chan
*Assistant Examiner* — David X Yi
(74) *Attorney, Agent, or Firm* — Nelson Mullins Riley & Scarborough LLP; EuiHoon Lee, Esq.

(57) ABSTRACT

A system for accumulating social relation information for social network services, includes a user location profile management unit for collecting at preset periods location profile information of a user; a user profile management unit for collecting and storing user profiles preset by the user; and a social activity tracking unit for collecting profiles from social activities of the user. Further, the system for accumulating the social relation information for the social network services includes a social relation information generation unit for collecting pieces of information received from the user location profile management unit, the user profile management unit, the email tracking unit, the chatting tracking unit and the Internet phone call tracking unit, and extracting new social relation information based on correlations between the pieces of collected information to generate a social relation ontology.

16 Claims, 9 Drawing Sheets

FIG. 3A

| ITEM | DESCRIPTION |
|---|---|
| (1) SENDER/RECEIVER | NAME OF THE OTHER PARTY |
| (2) ADDRESS FIELD | ADDRESS EXTENSION(co,re,go,com...) |
| (3) DATE | SENDING/RECEPTION DATE AND TIME |
| (4) SUBJECT TAG | WORDS USED IN TITLE |
| (5) ATTACH FILE | EXISTENCE OF ATTACHED FILE |
| (6) ATTACH FILE TYPE | TYPE OF ATTACHED FILE |
| (7) COUNTER | NUMBER OF ACCUMULATIONS |

FIG. 3B

| ITEM | DESCRIPTION |
|---|---|
| (1) NAME(G/M) | FULL NAME |
| (2) COMPANY/ DEPARTMENT/TITLE | SUBJECT-RELATED PROFILE |
| (3) EMAIL | EMAIL ADDRESS |
| (4) PHONE NUMBER | OFFICE/HOME/MOBILE/VoIP |
| (5) CALL TIME | TERMINATING/ORIGINATING CALL TIME BAND |

*FIG.3C*

| ITEM | DESCRIPTION |
|---|---|
| (1) GROUP ID | GROUP NAME |
| (2) ADDRESS | MESSENGER ADDRESS |
| (3) CONTACT TIME | CONNECTION TIME |
| (4) COUNTER | NUMBER OF CONNECTIONS |
| (5) LOGIN TIME | AVERAGE LOGON TIME BAND |
| (6) LOGOUT TIME | AVERAGE LOGOUT TIME BAND |

*FIG.5*

User Profile

```
<mysql>
<database name = "social_domain">
<table name = "userinfo">
<row>
<field name="Id">1</field>
<field name="userId">U007</field>
<field name="username"> HONG GILDONG </field>
<field name="userage">38</field>
<field name="usersex">0</field>
<field name="imageLoc">/webapp/image/user/U001.jpg</field>
<field name="usermail">lhk@abc.co.kr</field>
<field name="immail">avc@gmail.com</field>
<field name="phonenumber">010-0000-0000</field>
<field name="voipnumber">070-0000-0000</field>
<field name="address">GAJEONG-DONG, YUSEONG-GU, DAEJEON </field>
</row>
</table>
</database>
</mysql>
```

*FIG. 6*

| MIDDLE CATEGORY | LOWER CATEGORY | | | | |
|---|---|---|---|---|---|
| FAMILY (KnowsAsFamily -family) | SPOUSE | CHILD | PARENT | SIBLING | KIN |
| 100 | 101 | 102 | 103 | 104 | 105 |
| FRIEND (KnowsAsFriend -friend) | FRIEND | SCHOOLMATE | ACQUAINTNACE | | |
| 200 | 201 | 202 | 203 | | |
| COWORKER (KnowsAsCoworker -coworker) | CO-WORKER | COLLEAGUE | | | |
| 300 | 301 | 302 | | | |
| OPPOSITE SEX (romanticallyKnows -romantic) | BOYFRIEND | GIRLFRIEND | DATE | | |
| 400 | 401 | 402 | 403 | | |
| NEIGHBOR (physicallyKnows -location) | CO-RESIDENT | NEIGHBOR | | | |
| 500 | 501 | 502 | | | |

FIG. 7

```
<j.0:Person rdf:ID="U068">
 <j.1:parent
  <j.0:Person rdf:ID="U055">
   <j.1:co-worker>
    <j.0:Person rdf:ID="U048">
     <j.1:co-worker>
      <j.0:Person rdf:ID="U038">
        <j.1:co-worker rdf:resource="U055"/>
        <j.1:hasEmailAddress rdf:datatype="http://www.w3.org/2001/XMLSchema#string"
        >esv@gmail.com</j.1:hasEmailAddress>
        <j.1:co-worker>
        <j.0:Person rdf:ID="U018">
         <j.1:co-worker>
          <j.0:Person rdf:ID="U009">
          <j.1:hasEmailAddress rdf:datatype="http://www.w3.org/2001/XMLSchema#string"
          >fhj@gmail.com</j.1:hasEmailAddress>
          <j.1:co-worker rdf:resource="#U018"/>
          <j.1:hasSex rdf:datatype="http://www.w3.org/2001/XMLSchema#string"
          >female</j.1:hasSex>
          <j.1:co-worker rdf:resource=" #U048"/>
          <j.1:co-worker>
```

SYSTEM AND METHOD FOR ACCUMULATING SOCIAL RELATION INFORMATION FOR SOCIAL NETWORK SERVICES

CROSS-REFERENCE TO RELATED APPLICATIONS

The present invention claims priority of Korean Patent Application No. 10-2010-0004781, filed on Jan. 19, 2010, and Korean Patent Application No. 10-2010-0100085, filed on Oct. 14, 2010, which are incorporated herein by references.

FIELD OF THE INVENTION

The present invention relates to a technology for performing social network services; and, more particularly, to a system and method for accumulating social relation-information for social network services, which is suitable for a scheme for automatically extracting relations formed during a process of transmitting information among members based on social activities in a social network service, and collecting and managing information about social relations among digital members based on the extracted relations.

BACKGROUND OF THE INVENTION

In general, an information exchange service based on social relations, such as a social network service (SNS), is provided such that information about relations among digital members is personally entered by a user or is determined by mutual negotiation among the members. In most cases, such a method primarily forms social relations using specific categories such as friend/family/coworker, and thus a procedure for determining information about a relation with a specific user at each time is required to determine a new relation formed based on a social activity.

Most users use information exchange methods such as email/chatting/phone call when performing social activities. Objects that are mainly managed using such a method are grouped and managed using an address book, and are very rarely used when performing other information exchange methods. In particular, there is a need to actively use the experience/information of members having social relations as user-centered social relation information because of better reliability in a process of collecting information required to solve the problems (needs) of a specific user using a social network service.

However, from the standpoint of a user, methods that are merely used as the means of most social activities, such as email/chatting/phone call, are managed differently from the aspect of services in reality. In order to be interoperable with services such as a social network service, it is required to have additional information about the user and to make an effort to know various items required for relations to be formed.

In order to form a user-centered social relation information required for the conventional social network service implemented as described above, information needs to be collected in compliance with a social relation formation method required by a specific service provider so that services related to the specific service provider can be provided. However, this method described above is problematic in that each service provider has its own unique information system, so the relation information, as well as repetitive information, must be newly input for each service provider.

Further, even if social relation information changes, there is no method for simultaneously changing the information in all related service providers, and thus there is a limitation in that services are provided based on different pieces of information.

SUMMARY OF THE INVENTION

In view of the above, the present invention provides a system and method for accumulating social relation information for social network services, which can automatically extract relations formed during a process of transmitting information among members based on social activities (email/chatting/phone call) in a social network service, and can collect and manage social relation information among digital members based on the extracted relations.

Further, the present invention provides a system and method for accumulating social relation information for social network services, which is capable of collecting information about social relations with a user formed from the social activities of a specific user (email/chatting/Internet phone call), and storing and managing the social relation information using a normalized expression method, thus allowing social network service providers to provide services using a common interface, and to provide the services so that the same social relation information can be maintained even for other services.

In accordance with a first aspect of the present invention, there is provided a system for accumulating social relation information for social network services, including: a user location profile management unit for collecting at preset periods location profile information of a user; a user profile management unit for collecting and storing user profiles preset by the user; a social activity tracking unit for collecting profiles from social activities of the user; and a social relation information generation unit for collecting pieces of information and extracting new social relation information based on correlations between the pieces of collected information to generate a social relation ontology, wherein the pieces of information are received from the user location profile management unit, the user profile management unit and the social activity tracking unit.

In accordance with a second aspect of the present invention, there is provided a method for accumulating social relation information for social network services, including: collecting location profile information of a user at preset periods; collecting and storing user profiles preset by the user; collecting profiles by tracking social activities of the user; receiving and collecting pieces of information about individual profiles to generate a new social relation using comparison and investigation of correlations between the pieces of profile information; and generating a social relation ontology from information about the generated social relation.

In accordance with a third aspect of the present invention, there is provided a method for accumulating social relation information for social network services, including: receiving and collecting information about user profiles preset by a user, location profiles of the user and profiles collected from social activities of the user; determining whether a change has occurred in correlations with existing profiles by comparing and investigating correlations between the social activities; combining a correlation, which has been changed, with the existing profiles or updating the existing profiles, thus collecting social relation profiles; extracting relation information from the combined or updated information according to a preset classification for social relation formation; and converting the extracted relation information into a social relation Ontology Web Language (OWL).

In accordance with an embodiment of the present invention, the system and method for accumulating social relation information for social network services provides a method of collecting social relation information accumulated from the social activities of a user using a general storage method that can be commonly used in typical social network services and utilizing the social relation information. As a result, it is possible to implement a more efficient social relation information accumulation method.

Further, various types of information required to form a social relation ontology based on information collected from the Internet-based social activities of a user, e.g., email, messenger, Internet phone call, and the like are shared, so that a method of searching for a user-centered social relation map can be provided. Accordingly, efficient information management time and convenience can be provided so that more reliable information can be universally used for other social network services.

BRIEF DESCRIPTION OF THE DRAWINGS

FIGS. 3A to 3C are diagrams showing information about profiles for respective services that can be obtained by a user from social activities in accordance with an embodiment of the present invention;

FIG. 5 is a diagram showing user profiles required to form social relations in accordance with an embodiment of the present invention;

FIG. 6 is a diagram showing the classification system of social relation formation in social relation information management configuration schemes in accordance with an embodiment of the present invention;

FIG. 7 is a diagram showing the structure of an ontology for managing social relation information in accordance with an embodiment of the present invention.

DETAILED DESCRIPTION OF THE PREFERRED EMBODIMENTS

Hereinafter, embodiments of the present invention will be described in detail with reference to the accompanying drawings which form a part hereof.

Figure 1:
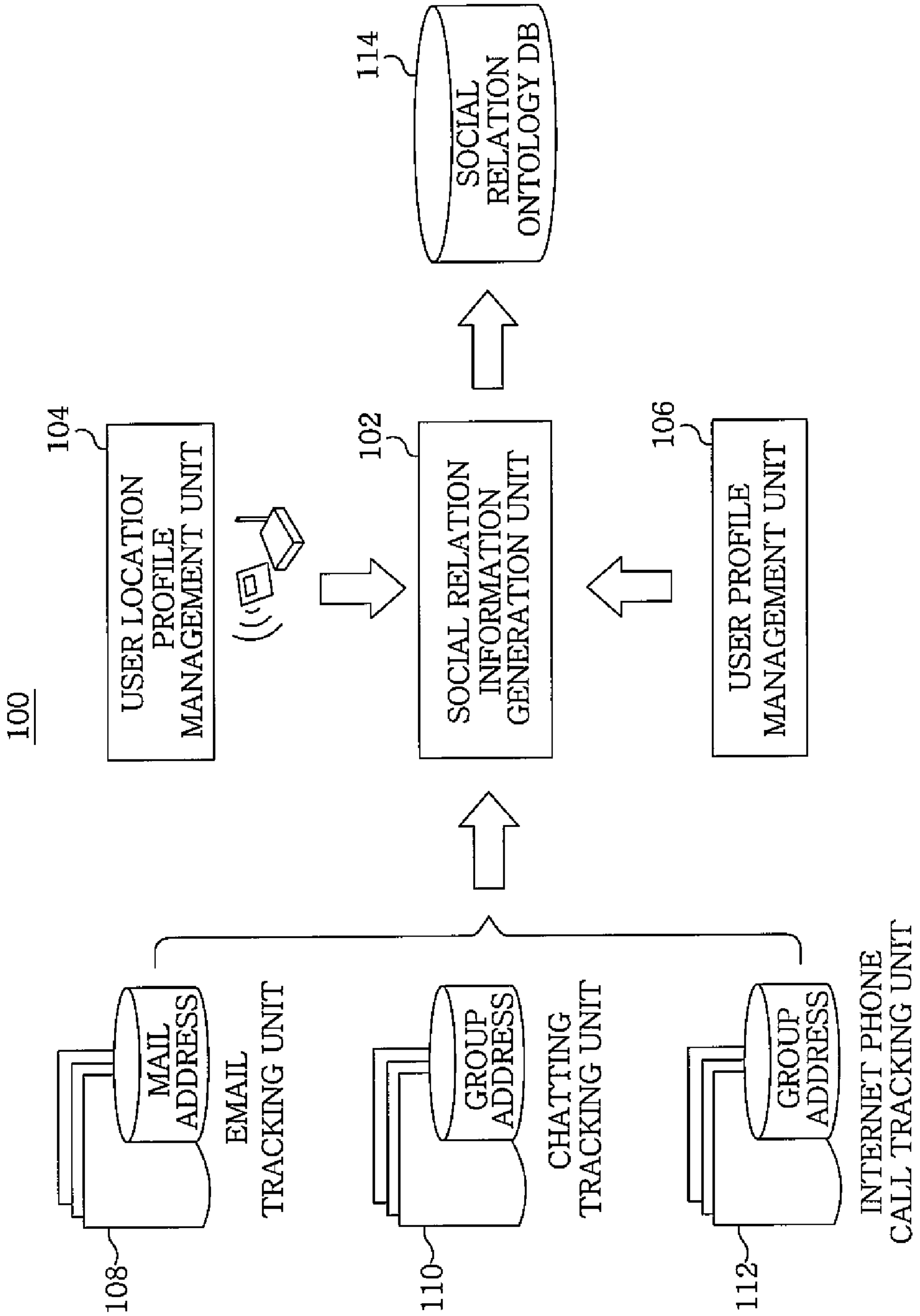
FIG. 1 is a diagram showing the construction of a system for accumulating social relation information for social network services.

FIG. 1 is a diagram showing the construction of a system for accumulating social relation information for social network services.

Referring to FIG. 1, a social relation information accumulation system 100 is a system for extracting social relations with other persons from the social activities of a user (email, chatting, Internet phone call and the like) and forming a new social relation based on the extracted social relations. The system 100 includes a social-relation information generation unit 102, a user location profile management unit 104, a user profile management unit 106, an email tracking unit 108, a chatting tracking unit 110, an Internet phone call (VoIP: Voice over Internet Protocol) tracking unit 112, a social relation ontology database (DB) 114.

The social relation information generation unit 102 collects pieces of information received from the user location profile management unit 104, the user profile management unit 106, the email tracking unit 108, the chatting tracking unit 110, and the Internet phone call tracking unit 112, extracts new social relation information based on correlations between the pieces of collected information, and then generate a social relation ontology. Further, the social relation information generation unit 102 converts the generated social relation ontology into an Ontology Web Language (OWL) that can be universally used in various types of social network services, and stores resulting data in the social relation ontology DB 114.

The user location profile management unit 104 collects, at preset periods, information about a location at which the user is located, to determine whether the current location of the user is in an office, a home or other place. In this case, collecting the location information of the user is performed in such a way that information is received either from a mobile computing device which receives a location signal from a Global Positioning System (GPS) satellite, or from a Radio Frequency Identification (RFID) reader which receives location information at a time at which an RFID tag attached to the user is read.

The user profile management unit 106 collects and stores profiles that can be preset by each user, detects profiles collected from the social activities based on the current location information of the user which can be identified either using the user profiles or in connection with the user location profile management unit 104, and stores and manages the detected information.

The email tracking unit 108 detects data profile information generated while the user exchanges emails with another party, and thus enables the data profile information to be used as information required to form social relations depending on new or past stored emails.

The chatting tracking unit 110 tracks information about data profiles related to instant messengers because most instant messengers for performing a Short Message Service (SMS) as a social network service retain information grouped for contacts.

The Internet phone call tracking unit 112 cannot extract social relation information using a typical Public Switched Data Network (PSDN) wired phone. Therefore, data profiles that can be tracked using the Internet phone based on the Internet are extracted to form relation information.

As described above, a social activity tracking unit of the user, which includes the email tracking unit 108, the chatting tracking unit 110, and the Internet phone call tracking unit 112 collects profiles from social activities of the user. Further, the data profiles respectively generated by the social activity tracking unit of the user are transferred to the social relation information generation unit 102.

Figure 2:
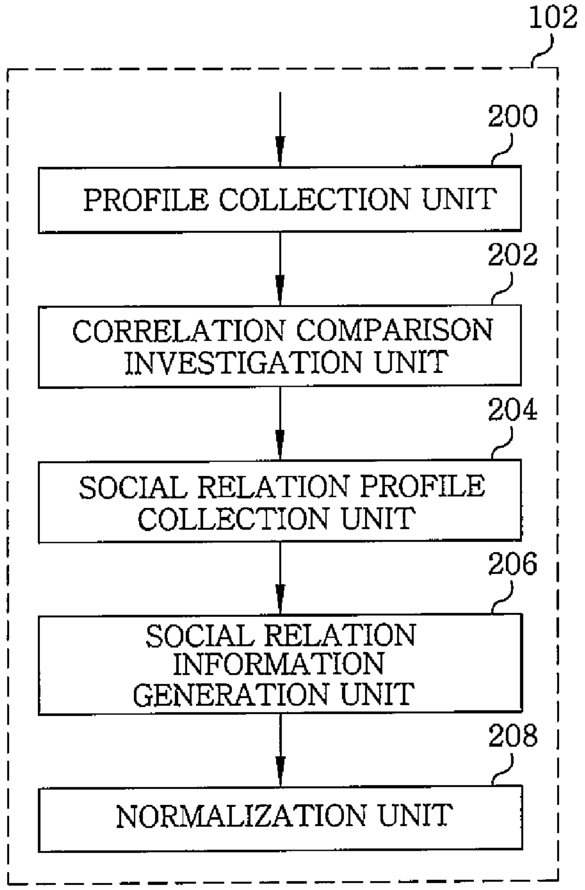
FIG. 2 is a block diagram showing the construction of a social relation information generation engine unit in accordance with an embodiment of the present invention.

FIG. 2 is a block diagram showing the construction of the social relation information generation engine unit according to an embodiment of the present invention.

Referring to FIG. 2, the social relation information generation unit 102 includes a profile collection unit 200, a correlation comparison investigation unit 202, a social relation profile collection unit 204, a social relation information generation unit 206 and a normalization unit 208.

The profile collection unit 200 collects information received from the user location profile management unit 104, the user profile management unit 106, the email tracking unit 108, the chatting tracking unit 110 and the Internet phone call tracking unit 112. In this way, the profile collection unit 200 monitors information collected by social activities in real time, to check information that has been accumulated and additionally collected for each unit.

The correlation comparison investigation unit 202 tracks common data required to find correlations between pieces of data based on the collected information, to compare and investigate correlations between the results of the social activities required to accumulate social relation information. Further, the correlation comparison investigation unit 202 checks whether the collected information has changed to determine whether the status of the relation information included in the existing data has changed.

The social relation profile collection unit 204 collects and manages profile information about subjects, e.g., users the social relations of which are to be registered based on various types of data collected from the social activities. Further, when a new data profile is received using the results of a social activity which have been compared and analyzed by the correlation comparison investigation unit 202, the social relation profile collection unit 204 combines the received information with the existing profile information and updates to store the combined profile information.

Further, when a new social relation is formed as a result of a new social activity which has been collected and stored by the social relation profile collection unit 204, the social relation information generation unit 206 generates relation information suitable for a preset classification system from the new social relation.

Further, the new social relation information classified by the social relation information generation unit 206 is updated to be in the structure of an OWL file required for the construction of an ontology by the normalization unit 208. That is, the social relation ontology OWL file is provided as a structurized file so that the same can be universally used for other social network services.

FIGS. 3A to 3C are diagrams showing information about profiles for respective services obtained by the user from social activities in accordance with an embodiment of the present invention. Information about profiles for respective services is transferred to and collected by the social relation information generation unit 102, and a new social relation model can be generated using the information about profiles for the respective services.

FIG. 3A shows information collected by the email tracking unit 108 from the history of emails sent or received via an email service and email address-related profiles.

A primary classification system can be formed using the address extensions of each receiver and each sender. For example, classification can be performed using extensions such as ‘co’ (commercial organizations) for businesses, ‘ac’ (academic organizations) for educational organizations, and ‘go’ (government organizations) for public institutions. Further, keyword categories are classified using the titles of emails sent or received, and words frequently used are classified into, e.g., office, friend, family and the like. Further, the similarities between the words are compared and investigated, so that related words are designated as secondary category items.

Furthermore, whether a relevant email is an officially sent file (document) or a file sent from a friend is determined according to the type of file attached to the email, and weights are added according to the type of file, so that the number of accumulations of weights is counted. As a result, a social relation model can be designated using comparison and investigation subsequently performed by the correlation comparison investigation unit 202.

Further, the name of the other party, the date and time of sending/reception, the existence of an attached file, etc. may be collected.

FIG. 3B shows a data profile generated by the Internet phone call tracking unit 112, and illustrates relation information tracked using the call history of Internet phone calls. For example, information about at least one of a full name, a subject-related profile, an email address, a phone number, and originating/terminating call time bands can be collected.

Most telephone directories are configured using such profiles, and email accounts (correlations with other profiles), the area codes of telephone numbers in Republic Of Korea (for example, 02, 031, 032, 042 and the like) and call time bands (working hour/closing hour) may be tracked and used to analyze social relation information.

FIG. 3C shows social relation information extracted from instant messages by the chatting tracking unit 110. For example, the chatting tracking unit 110 collects information about at least one of a group name, a messenger address, connection time, the number of connections, an average logon time band, and an average logout time band.

Most management tools are maintained to group and manage instant messages and to have information required to manage the emails of the other party. Further, the tools may use the time band of the latest connection, the number of connections, and the like as data required to track familiarity.

Figure 4:
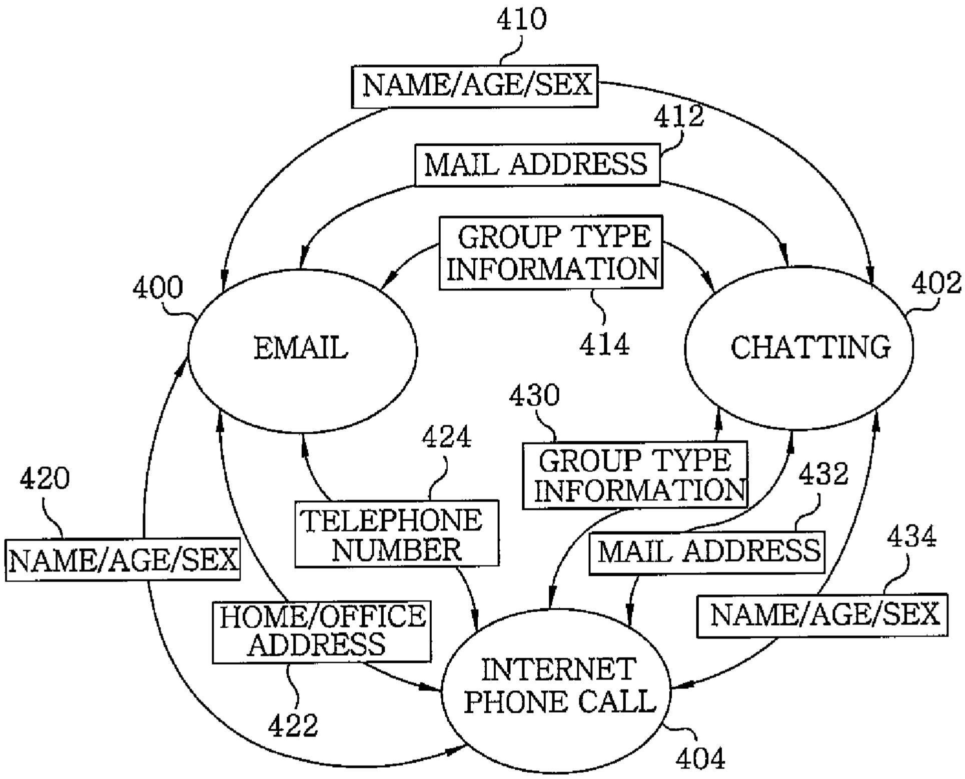
FIG. 4 is a diagram showing correlations between the results of social activities for accumulating social relation information in accordance with an embodiment of the present invention.

FIG. 4 is a diagram showing correlations between the results of social activities for accumulating social relation information in accordance with an embodiment of the present invention. When individual profiles are collected from the social activities, as shown in FIGS. 3A to 3C, the correlation comparison investigation unit 202 tracks the common data required to find mutual correlations among the pieces of data in the profiles.

The common elements of profiles collected from fields including the name/age/sex 410 of each user, the email address 412 of the user, and the group type information 414 of the user managed by chatting applications such as a messenger are tracked based on the information profiles of email 400 and chatting 402.

Further, a comparison operation for tracking the relation information between the pieces of data from name/age/sex 420, home/office address 422, and telephone number 424 is performed based on the information profiles of email 400 and Internet phone call 404.

Whether pieces of information collected from the services of chatting 402 and Internet phone call 404 are identical to each other can be determined using similarity and identicalness therebetween based on pieces of information compared using name/sex/age 434, email address 432, and group type information 430. In the comparison and investigation of correlations, as the number of pieces of information collected from the results of social activities increases, more reliable information results can be extracted.

FIG. 5 is a diagram showing user profiles required to form social relations in accordance with an embodiment of the present invention.

Referring to FIG. 5, the social relation profile collection unit 204 is configured to manage profile information about a subject, the social relations of which are to be registered based on various types of data collected from social activities. The social relation profile collection unit 204 collects and stores new data profiles using the results of the social activities compared and analyzed by the correlation comparison investigation unit 202. A plurality of pieces of data collected from the social activities, e.g., email, chatting, Internet phone call and the like are maintained such that they are correlated with social relation information to be used as instances of the subject. Each profile of the subject is used as a social relation information index configured as an ontology based on an ID.

FIG. 6 is a diagram showing the classification system of social relation formation in social relation information management configuration schemes in accordance with an embodiment of the present invention.

When a new social relation is finally formed by the social relation profile collection unit 204, the social relation information generation unit 206 generates social relation information in compliance with a social relation classification system.

As shown in FIG. 6, when a middle category is the family 100, lower category is categorized into spouse 101, child 102, parent 103, sibling 104, and kin 105. When a middle category is friend 200, the lower category is categorized into friend 201, schoolmate 202, and acquaintance 203. Further, when a middle category is coworker 300, the lower category is categorized into coworker 301 and colleague 302, and when a middle category is the opposite sex (in a romantic meaning) 400, the lower category is categorized into boyfriend 401, girlfriend 402 and date 403. Further, when a middle category is neighbor (in a locational meaning) 500, the lower category is categorized into co-resident 501 and neighbor 502.

FIG. 7 is a diagram showing the structure of an ontology for managing social relation information in accordance with an embodiment of the present invention.

The normalization unit 208 updates relation information, classified by the social relation information generation unit 206, to be in the structure of an OWL file required to construct an ontology, as shown in FIG. 7. The social relation ontology OWL file is a file which is structurized to be universally used for other social network services, and by which a social relation with a new subject or a new user is established and is maintained. Consequently, the social relation ontology OWL file can be used to provide a new service.

Figure 8:
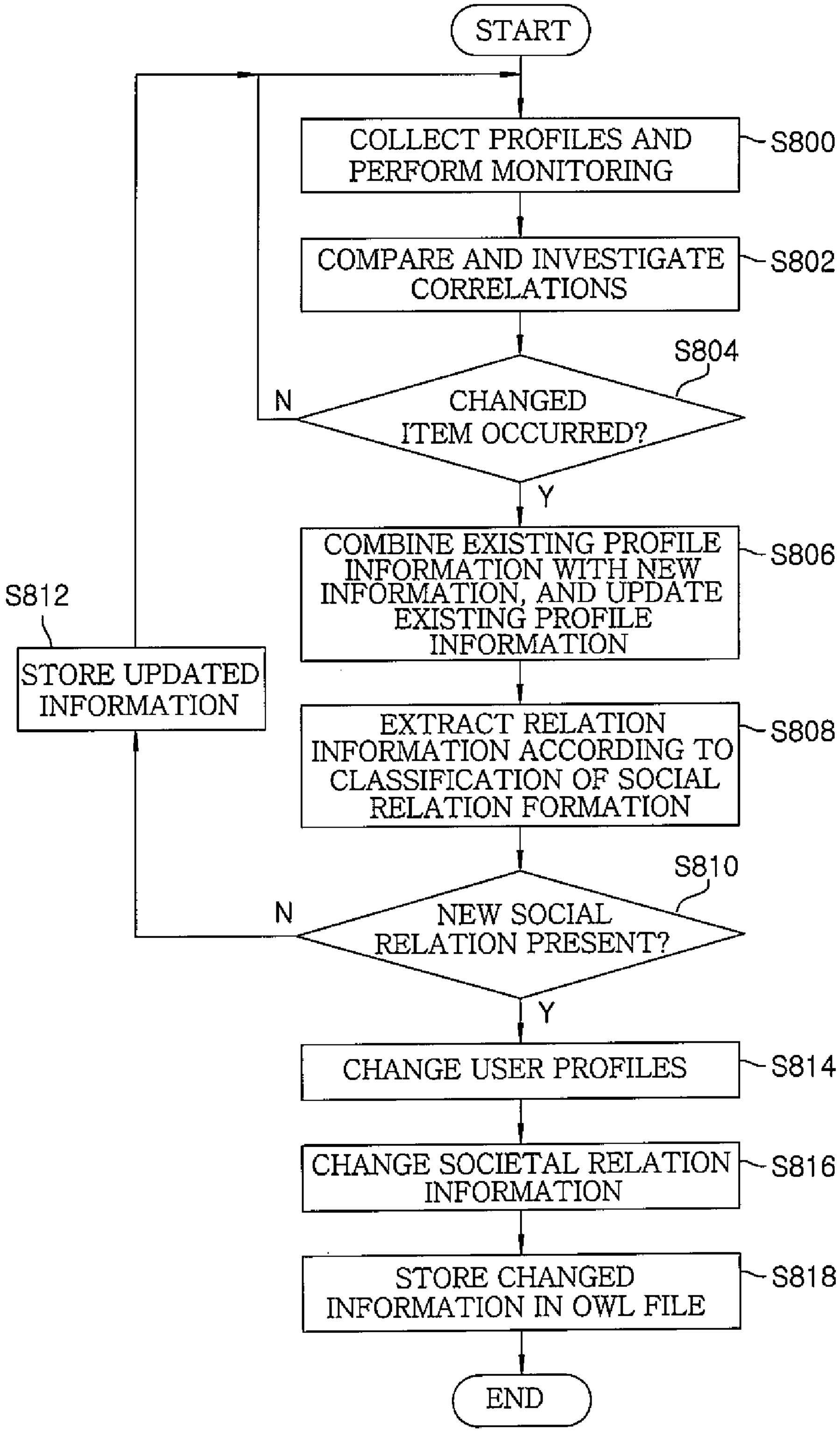
FIG. 8 is a flow chart showing the operating procedure of the social relation information generation engine unit for social network services in accordance with an embodiment of the present invention.

FIG. 8 is a flow chart showing the operating procedure of the social relation information generation unit for social network services in accordance with an embodiment of the present invention.

Referring to FIG. 8, the profile collection unit 200 of the social relation information generation unit 102 monitors information collected from social activities in real time, and then determines whether accumulated information or additionally collected information for each unit is present in step S800.

Further, in step S802, the correlation comparison investigation unit 202 examines whether a changed item has occurred by performing comparison and investigation between existing data and collected data. In step S804, if a changed item has not occurred as a result of the comparison and investigation even if newly collected information is present, the process returns to step S800 and the profile collection unit 200 is switched to a waiting state for collecting and monitoring profiles.

However, in step S804, if a changed item has occurred, i.e., the changed item is a new subject or is data capable of causing a change in the status of the relation information of the existing data as a result of the comparison and investigation, the process proceeds to step S806 and the social relation profile collection unit 204 combines new collected information received from the correlation comparison investigation unit 202 with the existing profile information to update the existing profile information.

Further, the social relation profile collection unit 204 transfers the combined and updated information to the social relation information generation unit 206, and extracts relation information according to the preset classification for social relation formation in step S808. However, when the extracted relation information is identical to the existing social relation, i.e., a new social relation is not present in step S810, the process proceeds to step S812 and only the updated information is stored, and returns to step S800 and then the profile collection unit 200 is switched to a collection and waiting state.

However, when the relation information extracted by the social relation profile collection unit 204 is information about a new social relation with the subject, the process proceeds to step S814 and user profile change information is transferred to the profile collection unit 200.

Further, in step S816, changed social relation information is transferred to the social relation profile collection unit 204. Finally, in step S818, an ontology corresponding to a changed portion attributable to the new social relation information is changed, and the changed ontology is stored in the OWL file.

As described above, the system and method for accumulating social relation information for social network services according to embodiments of the present invention is configured to automatically extract relations that are formed during a process of transmitting information among members based on social activities in a social network service, and to collect and manage social relation information among digital members based on the extracted relations.

While the invention has been shown and described with respect to the embodiments, it will be understood by those skilled in the art that various changes and modifications may be made without departing from the scope of the invention as defined in the following claims.

What is claimed is:

1. A system for accumulating social relation information for social network services, comprising:

a user location profile management unit for collecting at preset periods location profile information of a user;

a user profile management unit for collecting and storing user profiles preset by the user;

a social activity tracking unit for collecting profiles from social activities of the user;

a social relation information generation unit for collecting pieces of information and extracting new social relation information based on correlations between the pieces of collected information to generate a social relation ontology, wherein the pieces of information are received from the user location profile management unit, the user profile management unit and the social activity tracking unit;

wherein the social relation information generation unit comprises:

a profile collection unit for receiving and collecting information about the individual profiles;

a correlation comparison investigation unit for determining whether a change has occurred in correlations with existing profiles by comparing and investigating correlations between the social activities;

a social relation profile collection unit for combining a correlation, which has been changed, with the existing profiles or updating the existing profiles;

a social relation information generation unit for extracting relation information from the information collected by the social relation profile collection unit according to a preset classification for social relation formation; and a normalization unit for converting the extracted relation information into a social relation Ontology Web Language (OWL);

wherein the social relation information generation unit is configured such that:

if a new social relation has been extracted, changed user profiles are transferred to the profile collection unit, and changed social relation information is transferred to the social relation profile collection unit.

2. The system of claim 1, wherein the user location profile management unit collects location information received either from a mobile computing device which receives a location signal from a Global Positioning System (GPS) satellite, or from a Radio Frequency Identification (RFID) reader which collects location information at a time at which an RFID tag attached to the user is read.

3. The system of claim 1, wherein the user profile management unit detects profiles collected from social activities based on current location information in connection with the user location profile management unit.

4. The system of claim 1, wherein the social activity tracking unit comprises:

an email tracking unit for collecting history of emails sent or received using an email service and email address-related profiles;

a chatting tracking unit for collecting profiles based on instant messages sent or received using a chatting application; and an Internet phone call tracking unit for collecting profiles based on a call history of Internet phone calls.

5. The system of claim 4, wherein the email tracking unit collects information about at least one of an extension of an email address, a keyword of an email title, a name of another party, existence and a type of attached file, and a number of accumulations.

6. The system of claim 4, wherein the Internet phone call tracking unit collects information about at least one of a full name of the user, a subject-related profile, an email address, a phone number, and originating/terminating call time bands.

7. The system of claim 4, wherein the chatting tracking unit collects information about at least one of a group name, a messenger address, a connection time, a number of connections, an average logon time band, and an average logout time band.

8. The system of claim 1, wherein the OWL is universally used in different types of social network services.

9. A method for accumulating social relation information for social network services, comprising:

collecting location profile information of a user at preset periods;

collecting and storing user profiles preset by the user;

collecting profiles by tracking social activities of the user;

receiving and collecting pieces of information about individual profiles to generate a new social relation using comparison and investigation of correlations between the pieces of profile information;

generating a social relation ontology from information about the generated social relation;

receiving and collecting information about user profiles preset by a user, location profiles of the user and profiles collected from social activities of the user;

determining whether a change has occurred in correlations with existing profiles by comparing and investigating correlations between the social activities;

combining a correlation, which has been changed, with the existing profiles or updating the existing profiles, thus collecting social relation profiles;

extracting relation information from the combined or updated information according to a preset classification for social relation formation; and converting the extracted relation information into a social relation Ontology Web Language (OWL);

wherein said extracting the relation information comprises:

if a new social relation has been extracted, changing the user profiles; and changing the social relation profiles.

10. The method of claim 9, wherein the location profile information of the user is obtained by collecting location information received either from a mobile computing device which receives a location signal from a Global Positioning System (GPS) satellite, or from a Radio Frequency Identification (RFID) reader which collects location information at a time at which an RFID tag attached to the user is read.

11. The method of claim 9, wherein said collecting and storing the user profiles further comprises detecting profiles collected from social activities based on current location information detected from the location profile information of the user.

12. The method of claim 9, wherein said tracking the social activities comprises:

performing email tracking by collecting history of emails sent or received using an email service and email address-related profiles;

performing chatting tracking by collecting profiles based on instant messages sent or received using a chatting application; and performing Internet phone call tracking by collecting profiles based on a call history of Internet phone calls.

13. The method of claim 12, wherein said performing the email tracking further comprises collecting information about at least one of an extension of an email address, a keyword of an email title, a name of another party, existence and a type of attached file, and a number of accumulations.

14. The method of claim 12, wherein said performing the Internet phone call tracking further comprises collecting information about at least one of a full name of the user, a subject-related profile, an email address, a phone number, and originating/terminating call time bands.

15. The method of claim 12, wherein said performing the chatting tracking further comprises collecting information about at least one of a group name, a messenger address, a connection time, a number of connections, an average logon time band, and an average logout time band.

16. The method of claim 9, wherein the OWL is universally used in different types of social network services.

* * * * *